United States Patent
Pombo

(10) Patent No.: US 8,040,600 B2
(45) Date of Patent: Oct. 18, 2011

(54) BINOCULAR DISPLAY HAVING AN ADJUSTMENT SYSTEM

(75) Inventor: Stephen A. Pombo, Campbell, CA (US)

(73) Assignee: Kopin Corporation, Taunton, MA (US)

( * ) Notice: Subject to any disclaimer, the term of this patent is extended or adjusted under 35 U.S.C. 154(b) by 1169 days.

(21) Appl. No.: 11/805,251

(22) Filed: May 21, 2007

(65) Prior Publication Data
US 2008/0042038 A1   Feb. 21, 2008

Related U.S. Application Data

(60) Provisional application No. 60/813,924, filed on Jun. 15, 2006.

(51) Int. Cl.
*G02B 23/00* (2006.01)
(52) U.S. Cl. ....................................................... 359/412
(58) Field of Classification Search .................. None
See application file for complete search history.

(56) References Cited

U.S. PATENT DOCUMENTS

| 4,961,626 | A | * | 10/1990 | Fournier et al. ............... 359/630 |
| 6,239,771 | B1 | | 5/2001 | Usuki et al. |
| 6,448,944 | B2 | | 9/2002 | Ronzani et al. |
| 6,452,572 | B1 | | 9/2002 | Fan et al. |

FOREIGN PATENT DOCUMENTS

| EP | 0 592 318 A | 4/1994 |
| EP | 0 627 850 A | 12/1994 |

* cited by examiner

*Primary Examiner* — Derek S Chapel
(74) *Attorney, Agent, or Firm* — Hamilton, Brook, Smith & Reynolds, P.C.

(57) ABSTRACT

A binocular display device can include first and second display assemblies. A rail system can adjustably support the first and second display assemblies. The rail system can have a first rail slidably secured to a front region of the display assemblies, and second rail slidably secured to a rear region of the display assemblies. One rail can be at an upper region and the other rail can be at a lower region. Each display assembly can be slidably mounted to one rail along a bearing length $L_1$ and to the other rail along a bearing length $L_2$ that is less than the bearing length $L_1$. A release/locking system can be included for releasing the display assemblies relative to the rail system to allow the position of the display assemblies relative to each other on the rail system to be adjusted, and for locking the display assemblies at a desired position.

21 Claims, 2 Drawing Sheets

BINOCULAR DISPLAY HAVING AN ADJUSTMENT SYSTEM

RELATED APPLICATION(S)

This application claims the benefit of U.S. Provisional Application No. 60/813,924, filed on Jun. 15, 2006. The entire teachings of the above application(s) are incorporated herein by reference.

BACKGROUND

Binocular display devices typically include two display assemblies, each having a display panel, such as a liquid crystal display (LCD) panel, and a lens assembly, for viewing the display panel. For binocular viewing, the two display panels are aligned so that the images on the display panels appear to converge at a predetermined distance. Some binocular display devices can have display assemblies that are positioned at a fixed distance apart from each other. Since the distance between the eyes or interpupillary distance (IPD) of some individuals can vary, the quality of viewing by individuals having an IPD that differs from the fixed distance between the display assemblies can be less than optimal.

SUMMARY

The present invention can provide a binocular display device having display assemblies that can be laterally adjusted relative to each other to suit the IPD of a viewer.

In particular embodiments, the binocular display device can include first and second display assemblies. A slide or rail system can adjustably support the first and second display assemblies. The rail system can have a first slide or rail slidably secured to a front region of the display assemblies, and second slide or rail slidably secured to a rear region of the display assemblies. One rail can be at an upper region and the other rail can be at a lower region. Each display assembly can be slidably mounted to one rail along a bearing length $L_1$, and to the other rail along a bearing length $L_2$ that is less than the bearing length $L_1$. A release/locking system can be included for releasing the display assemblies relative to the rail system to allow the position of the display assemblies relative to each other on the rail system to be adjusted, and for locking the display assemblies at a desired position.

In some embodiments, the first rail can be positioned above the display assemblies and the second rail can be positioned below the display assemblies. A frame can support the first and second rails. Each display assembly can be mounted to the first rail along the bearing length $L_1$, and to the second rail along the bearing length $L_2$. The bearing length $L_1$ can have two slidable bearings that are spaced apart from each other, and the bearing length $L_2$ can have one slidable bearing. The release/locking system can have lockable levers for releasing and locking the display assemblies. The release/locking system can include a detent mechanism to provide a series of set adjustment positions. A housing can be mounted to the rail system between the display assemblies, and can contain circuitry.

The present invention also provides a binocular display device including first and second display assemblies. A rail system can adjustably support the first and second display assemblies. The rail system can have a first rail slidably secured to a front region of the display assemblies, and a second rail slidably secured to a rear region of the display assemblies. The first rail can be at an upper region and the second rail can be at a lower region. Each display assembly can be slidably mounted to the first rail along a bearing length $L_1$ and to the second rail along a bearing length $L_2$ that is less than the bearing length $L_1$. A frame can support the rail system. A release/locking system can be included which is capable of releasing the display assemblies relative to the rail system to allow the position of the display assemblies relative to each other on the rail system to be adjusted, and for locking the display assemblies at a desired position.

The present invention further provides a method of supporting first and second display assemblies of a binocular display device including adjustably supporting the first and second display assemblies on a rail system. The rail system can have a first rail slidably secured to a front region of the display assemblies, and a second rail slidably secured to a rear region of the display assemblies. One rail can be at an upper region and the other rail can be at a lower region. Each display assembly can be slidably mounted to one rail along a bearing length $L_1$ and to the other rail along a bearing length $L_2$ that is less than bearing length $L_1$. A release/locking system can be provided which is capable of releasing the display assemblies relative to the rail system to allow the position of the display assemblies relative to each other and the rail system to be adjusted, and for locking the display assemblies at a desired position.

In particular embodiments, the first rail can be positioned above the display assemblies, and the second rail can be positioned below the display assemblies. The first and second rails can be supported with a frame. Each display assembly can be mounted to the first rail along the bearing length $L_1$, and to the second rail along the bearing length $L_2$. The bearing length $L_1$ can be formed by two slidable bearings that are spaced apart from each other, and the bearing length $L_2$ can be formed with one slidable bearing. The release/locking system can include lockable levers for releasing and locking the display assemblies. The release/locking system can have a detent mechanism for providing series of set adjustment positions. A housing containing circuitry can be mounted to the rail system between the display assemblies.

Advantages of the present invention can include stable adjustment and securement of the display assemblies with a rail system of minimal size weight and complexity.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
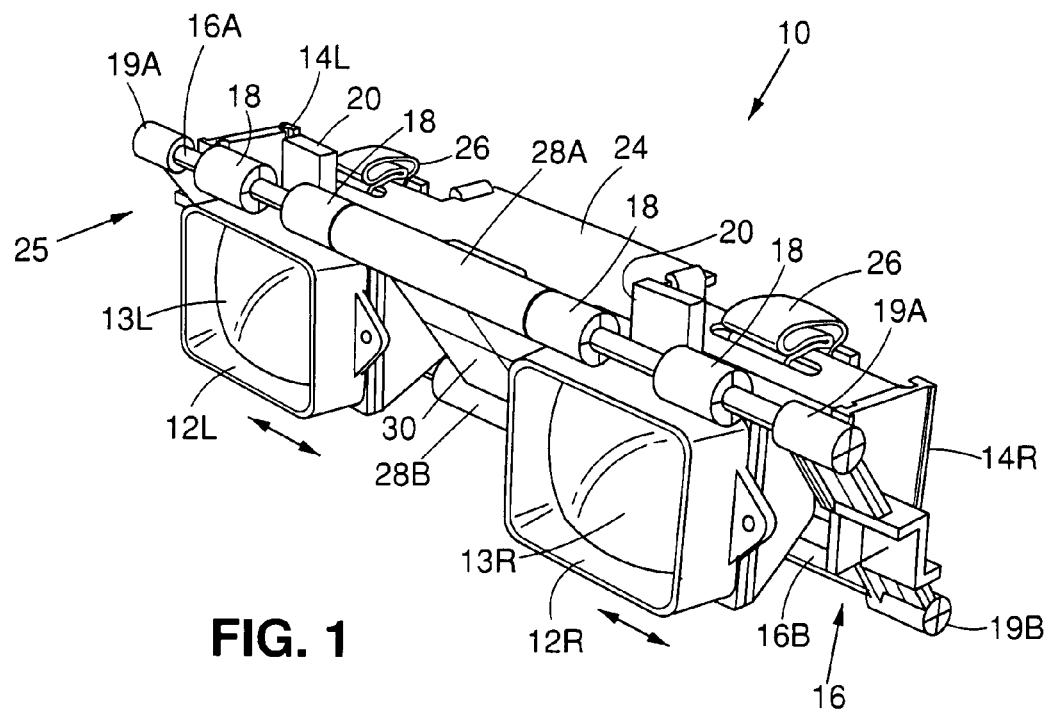
FIG. 1 is a perspective view of a binocular display device having an adjustment system for adjusting the distance between the display assemblies.
Figure 2:
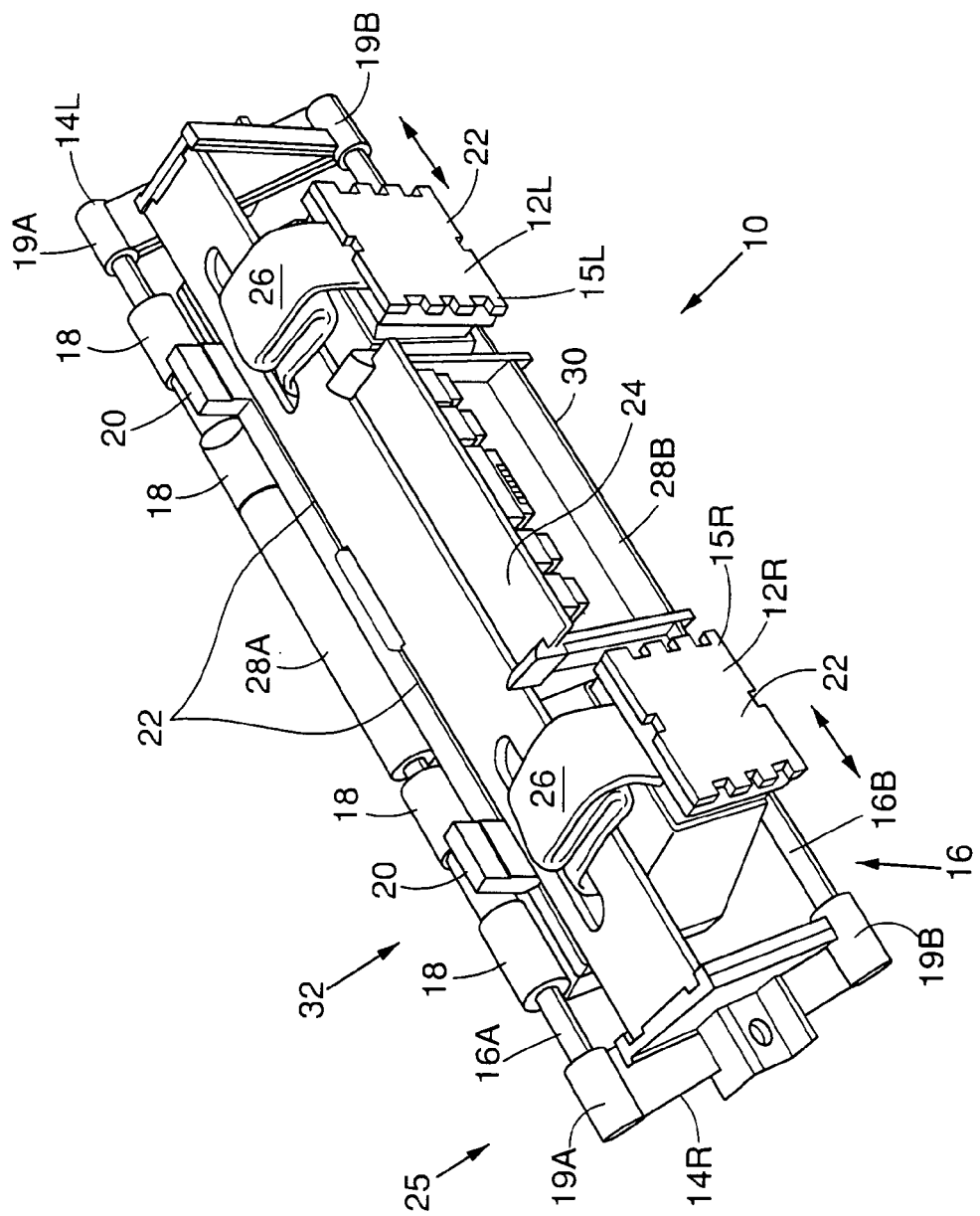
FIG. 2 is a top perspective view of the binocular display device of FIG. 1.

Referring to FIGS. 1 and 2, binocular display device 10 is an example of one possible binocular display device or module, and has a first or right display assembly 12R and a second or left display assembly 12L. The display assemblies 12R and 12L can be simultaneously viewed by a user for binocular viewing. The display assemblies 12R and 12L can include a first or right display panel 15R and a second or left display panel 15L, and a first or right lens assembly 13R and a second or left lens assembly 13L for viewing respective display panels 15R and 15L. The display panels 15R and 15L can be liquid crystal display (LCD) panel assemblies and can include backlighting. Alternatively, other suitable display panels can be employed. The display panels 15R and 15L can be electronically connected to a circuit board 24 by cables 26 and can be provided with moving picture images such as video images, computerized images, still images, etc. The circuit board 24 can be mounted in or on a housing 30 that is positioned between the display assemblies 12R and 12L. In one embodiment, the binocular display device 10 can be VGA, but alternatively can be QVGA, wide VGA, etc.

The binocular display device 10 can have an adjustment system 25 to allow the user to adjust the distance between the display assemblies 12R and 12L to correspond or match the interpupillary distance (IPD) of the user's eyes, for optimizing viewing. In one embodiment, adjustment can range from about 56 mm to 70 mm. In addition, other adjustment ranges can be used. The adjustment system 25 can include a rail or slide system 16 that has a first or front rail or slide 16A, and a parallel second or rear rail or slide 16B, which are supported between the mounts 19A and 19B of a first or right end frame 14R, and a second or left end frame 14L. The front rail 16A can be positioned above the display assemblies 12R and 12L, and the rear rail 16B can be positioned below the display assemblies 12R and 12L.

Figure 3:
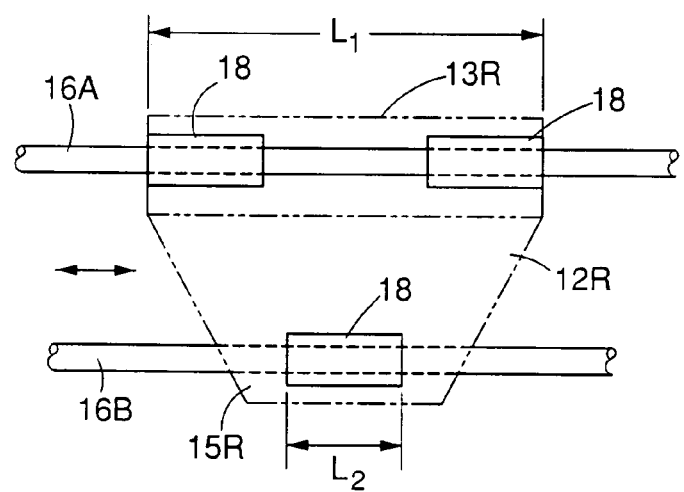
FIG. 3 is a top schematic view of a display assembly mounted to a rail system.

The rails 16A and 16B can be rods with a circular cross-section, as shown, but can have other suitable cross sections or profiles. The front rail 16A can be at an upper position, and the rear rail 16B can be at a lower position, as shown, but alternatively, the positions can be reversed. The display assemblies 12R and 12L can include linear slides or bearings 18 for slidably mounting or securing the display assemblies 12R and 12L on the rails 16A and 16B. As a result, the display assemblies 12R and 12L can be laterally slidably mounted or secured to the rails 16A and 16B at the top front, and the bottom rear regions of the display assemblies 12R and 12L. The top front region of each display assembly 12R and 12L can be laterally slidably mounted or secured to rail 16A by two slidable linear bushings or bearing 18 which are spaced apart to form a bearing length $L_1$ (FIG. 3). The rear bottom region of each display assembly 12R and 12L can be laterally slidably mounted or secured to rail 16B by one slidable linear bushing or bearing 18 having a bearing length of $L_2$, which is less than the bearing length $L_1$, and can be centered relative to bearing length $L_1$. Slidably supporting the display assembles 12R and 12L at opposite diagonal regions (front vs. back and top vs. bottom) can provide suitable slidable support for the display assemblies 12R and 12L with only two rails 16A and 16B. In addition, by having one bearing length $L_2$ that is less than the other bearing length $L_1$ and centered relative to bearing length $L_1$, the likelihood of binding of the display assemblies 12R and 12L on the rails 16A and 16B can be prevented or reduced. The shorter bearing length $L_2$ on one rail 16B can allow the display assemblies 12R and 12L to slide on only two rails 16A and 16B, without binding or locking up. If desired, the bearing length $L_1$ can be formed by a single slidable bushing or bearing 18 of the desired length. In addition, the bearing length $L_2$ can be formed by two spaced apart bushings or bearings 18.

The adjustment system 25 can include a release/locking system 32 for releasing one or both of the display assemblies 12R and 12L to allow lateral sliding on the rail system 16 towards and away from each other as shown by the arrows, and for locking the display assemblies 12R and 12L in desired adjusted lateral IPD positions for viewing. The release/locking system 32 can include lockable levers 20 associated with the display assemblies 12R and 12L, which when moved, can unlock the display assemblies 12R and 12L for movement on the rail system 16. When the levers 20 are moved back to their original position, the display assemblies 12R and 12L can lock in place. In one embodiment, the housing 30 can include a detent mechanism 22 having a series of notches or tabs which can engage a bump on the display assemblies 12R and 12L to provide a series of different set positions of lateral adjustment for the display assemblies 12R and 12L. In other embodiments, suitable mechanisms can be used where the adjustments that are made can be continuous with no set positions, for example, with a frictional locking mechanism. Additionally, the release/locking system 32 can be employed with other slide or rail configurations than shown in the figures.

The housing 30 can be mounted or secured to rails 16A and 16B by mounts 28A and 28B between the display assemblies 12R and 12L. The housing 30 can also be mounted to the end frames 14R and 14L. Although a rigid circuit board 28 has been shown in the drawings, alternatively, a flex containing the necessary drive circuits can be employed. In addition, device 10 can provide monocular viewing to each eye, for example, from different sources.

In some embodiments, the display device 10, circuitry, and display assemblies 12R and 12L can be configured for providing three-dimensional viewing.

While this invention has been particularly shown and described with references to particular embodiments thereof, it will be understood by those skilled in the art that various changes in form and details may be made therein without departing from the scope of the invention encompassed by the appended claims.

For example, the rails can be supported by other suitable frame configurations. If desired, additional rails can be included in the rail system. Furthermore, the housing can have other configurations. The adjustment system can also be used for adjusting the position of lens assemblies, optical assemblies, or other optical components.

What is claimed is:

1. A binocular display device comprising:
    first and second display assemblies;
    a rail system for adjustably supporting the first and second display assemblies, the rail system having only two rails with a first rail slidably secured to a front region of the display assemblies, and a second rail slidably secured to a rear region of the display assemblies, one rail being positioned above the display assemblies and the other rail being positioned below the display assemblies, each display assembly being slidably mounted to one rail along a bearing length $L_1$ and to the other rail along a bearing length $L_2$ that is less than the bearing length $L_1$, whereby each display assembly is slidably mounted to the only two rails; and
    a locking system capable of releasing the display assemblies relative to the rail system to allow the position of the display assemblies relative to each other on the rail system to be adjusted, and for locking the display assemblies at a desired position.

2. The display device of claim 1 in which the first rail is positioned above the display assemblies.

3. The display device of claim 2 in which the second rail is positioned below the display assemblies.

4. The display device of claim 3 further comprising a frame for supporting the first and second rails.

5. The display device of claim 3 in which each display assembly is mounted to a first rail along the bearing length $L_1$, and to the second rail along the bearing length $L_2$.

6. The display device of claim 5 in which the bearing length $L_1$ comprises two slidable bearings that are spaced apart from each other.

7. The display device of claim 6 in which the bearing length $L_2$ comprises one slidable bearing.

8. The display device of claim 1 in which the release/locking system comprises lockable levers for releasing and locking the display assemblies.

9. The display device of claim 8 in which the release/locking system further comprises a detent mechanism to provide a series of set adjustment positions.

10. The display device of claim 1 further comprising a housing mounted to the rail system between the display assemblies, the housing containing circuitry.

11. A binocular display device comprising:
first and second display assemblies;
a rail system for adjustably supporting the first and second display assemblies, the rail system having only two rails with a first rail slidably secured to a front region of the display assemblies, and a second rail slidably secured to a rear region of the display assemblies, the first rail being positioned above the display assemblies and the second rail being positioned below the display assemblies, each display assembly being slidably mounted to the first rail along a bearing length $L_1$ and to the second rail along a bearing length $L_2$ that is less than the bearing length $L_1$, whereby each display assembly is slidably mounted to the only two rails;
a frame for supporting the rail system; and
a locking system capable of releasing the display assemblies relative to the rail system to allow the position of the display assemblies relative to each other on the rail system to be adjusted, and for locking the display assemblies at a desired position.

12. A method of supporting first and second display assemblies of a binocular display device comprising:
adjustably supporting the first and second display assemblies on a rail system, the rail system having only two rails with a first rail slidably secured to a front region of the display assemblies, and a second rail slidably secured to a rear region of the display assemblies, one rail being positioned above the display assemblies and the other rail being positioned below the display assemblies, each display assembly being slidably mounted to one rail along a bearing length $L_1$ and to the other rail along a bearing length $L_2$ that is less than the bearing length $L_1$, whereby each display assembly is slidably mounted to the only two rails; and
providing a locking system capable of releasing the display assemblies relative to the rail system to allow the position of the display assemblies relative to each other on the rail system to be adjusted, and for locking the display assemblies at a desired position.

13. The method of claim 12 further comprising positioning the first rail above the display assemblies.

14. The method of claim 13 further comprising positioning the second rail below the display assemblies.

15. The method of claim 14 further comprising supporting the first and second rails with a frame.

16. The method of claim 14 further comprising mounting each display assembly to the first rail along the bearing length $L_1$, and to the second rail along the bearing length $L_2$.

17. The method of claim 16 further comprising forming the bearing length $L_1$ with two slidable bearings that are spaced apart from each other.

18. The method of claim 17 further comprising forming the bearing length $L_2$ with one slidable bearing.

19. The method of claim 12 further comprising providing the release/locking system with lockable levers for releasing and locking the display assemblies.

20. The method of claim 19 further comprising providing the release/locking system with a detent mechanism for providing a series of set adjustment positions.

21. The method of claim 12 further comprising mounting a housing containing circuitry to the rail system between the display assemblies.

* * * * *